Figure 1:
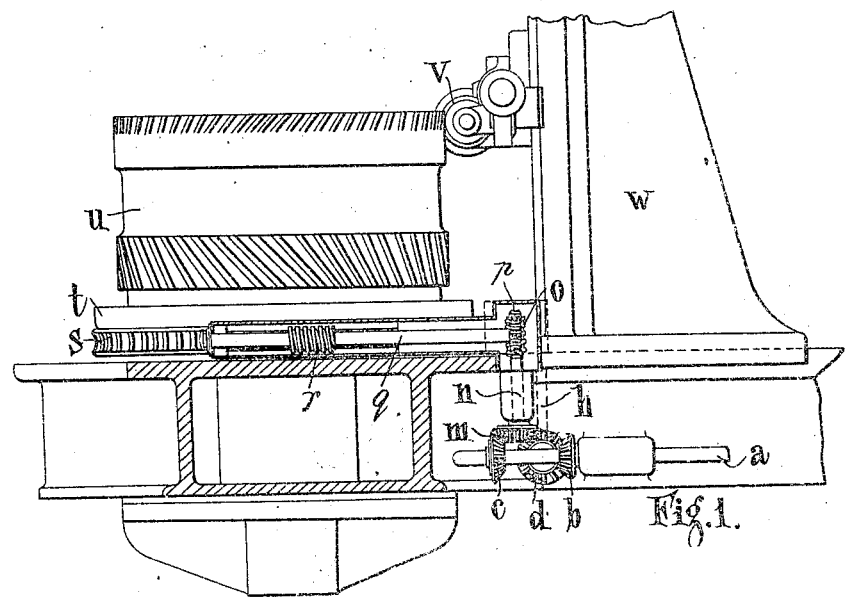

C. A. PARSONS & S. S. COOK.
FORMATION OF GEAR WHEEL TEETH.
APPLICATION FILED MAR. 25, 1913.

1,199,601.

Patented Sept. 26, 1916.
7 SHEETS—SHEET 1.

WITNESSES
C E Parsons
Ed L Tolson

INVENTORS
Charles A. Parsons
BY Stanley S Cook
ATTORNEYS

C. A. PARSONS & S. S. COOK.
FORMATION OF GEAR WHEEL TEETH.
APPLICATION FILED MAR. 25, 1913.

1,199,601.

Patented Sept. 26, 1916.
7 SHEETS—SHEET 4.

WITNESSES
E. M. Hamilton.
C. E. Parsons

INVENTORS
Charles A. Parsons and
Stanley S. Cook.
BY
Spear, Middleton, Donaldson & Spear
ATTORNEYS C. A. PARSONS & S. S. COOK.
FORMATION OF GEAR WHEEL TEETH.
APPLICATION FILED MAR. 25, 1913.
1,199,601.
Patented Sept. 26, 1916.
7 SHEETS—SHEET 5.
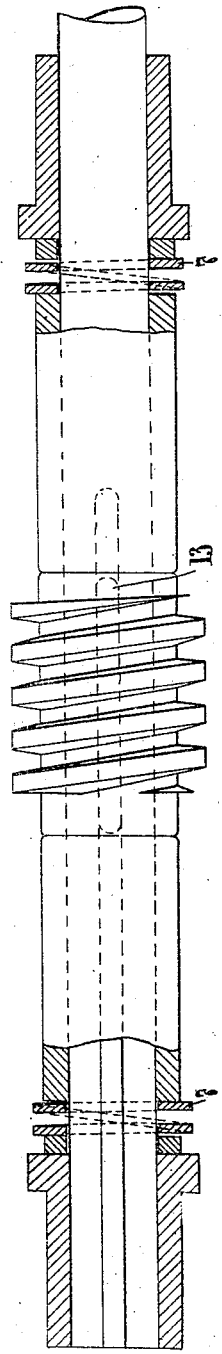
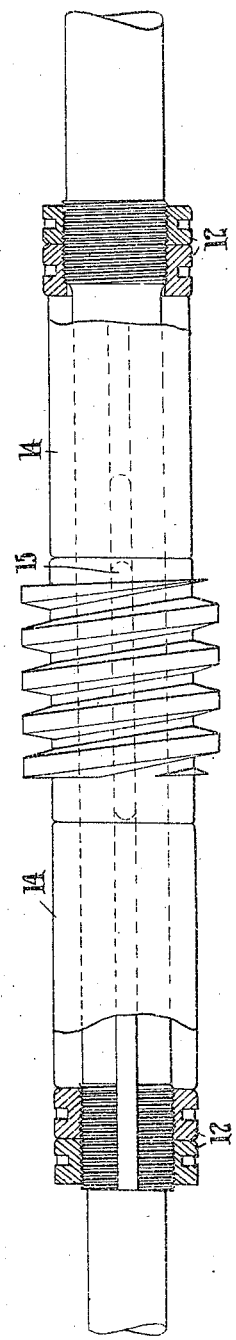

UNITED STATES PATENT OFFICE.

CHARLES ALGERNON PARSONS, OF NEWCASTLE-UPON-TYNE, AND STANLEY SMITH COOK, OF WALLSEND, ENGLAND; SAID COOK ASSIGNOR TO SAID PARSONS.

FORMATION OF GEAR-WHEEL TEETH.

1,199,601.   Specification of Letters Patent.   Patented Sept. 26, 1916.

Application filed March 25, 1913. Serial No. 756,760.

*To all whom it may concern:*

Be it known that we, CHARLES ALGERNON PARSONS, K. C. B., of Heaton Works, Newcastle-upon-Tyne, in the county of Northumberland, England, and STANLEY SMITH COOK, of Turbinia Works, Wallsend-on-Tyne, in the county of Northumberland, England, subjects of the King of Great Britain and Ireland, have invented certain new and useful Improvements in and Relating to the Formation of Gear-Wheel Teeth, of which the following is a specification.

This invention relates to a method of and means for forming the teeth of gear wheels, its object being to enable such wheels to be constructed with a higher degree of accuracy than is obtainable with the processes at present adopted for forming gear wheel teeth.

While present machines form the teeth with a high order of accuracy a still higher degree of accuracy is desirable to insure the silent operation of such wheels when transmitting large powers at high speeds, and also to minimize wear.

It is obvious that with the processes already adopted the accuracy of the finished wheel cannot be greater than that of the members of the parent driving gear of the machine by which the teeth were formed. Local irregularities in the driving gear cause irregularities in the teeth of the wheels being formed, which exactly correspond in angular position with those of the driving gear, and which when such wheels are in operation for the transmission of power will give rise to periodic vibrations, often of high frequency, and therefore productive of noise.

The present invention consists in a method of forming the teeth of a gear wheel in which the relative position of the member forming the teeth and the wheel on which the teeth are being formed is determined by the general or average configuration of the members of the parent gear. In this manner, instead of the formation of the teeth being affected by irregularities as above described, the gear wheel teeth are produced without irregularities or at least with errors of very much smaller amplitude than those of the parent gear rotating the work.

The invention also consists in eliminating residual errors in the teeth of a gear wheel by grinding the same with a lap extending a considerable length over several teeth, so as to be guided by the average configuration of such teeth.

The invention further consists in a method of and apparatus for forming the teeth of gear wheels as hereinafter described.

Figure 2:
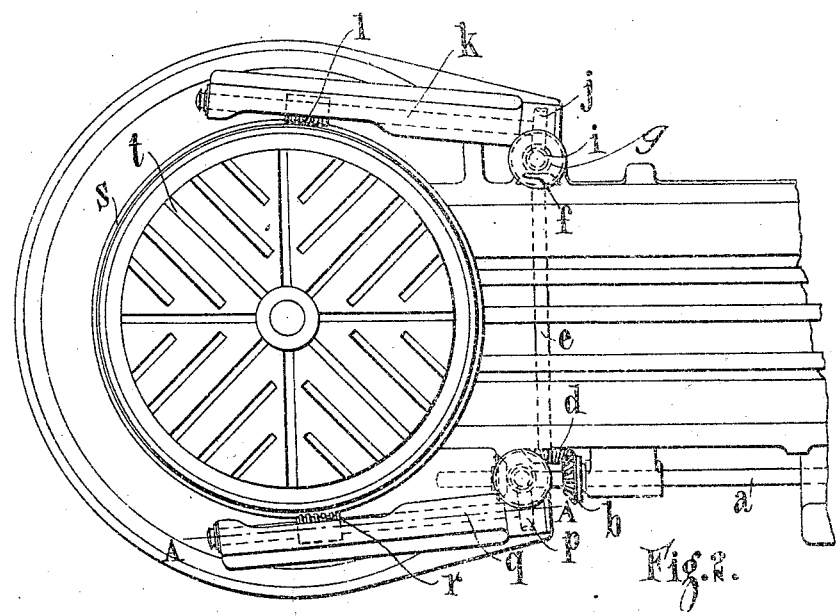
Figure 3:
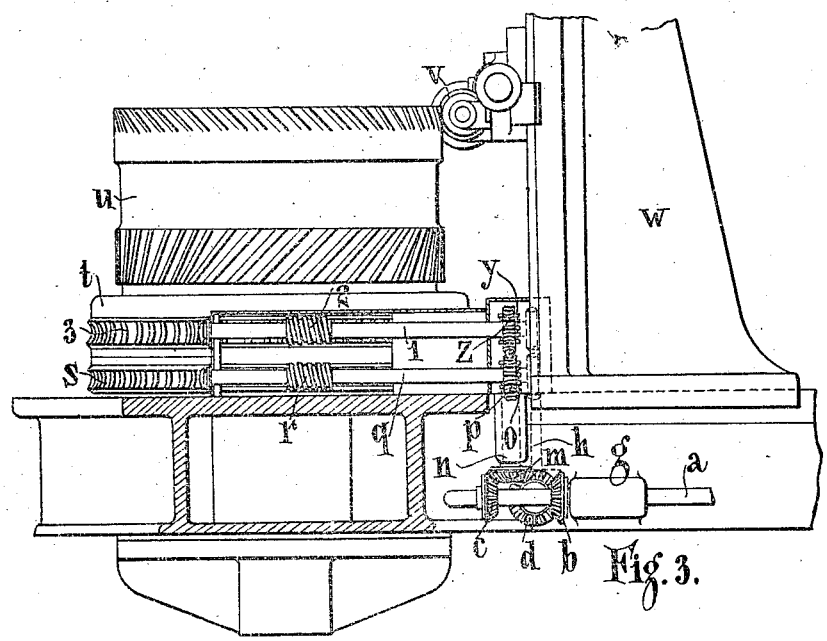
Figure 4:
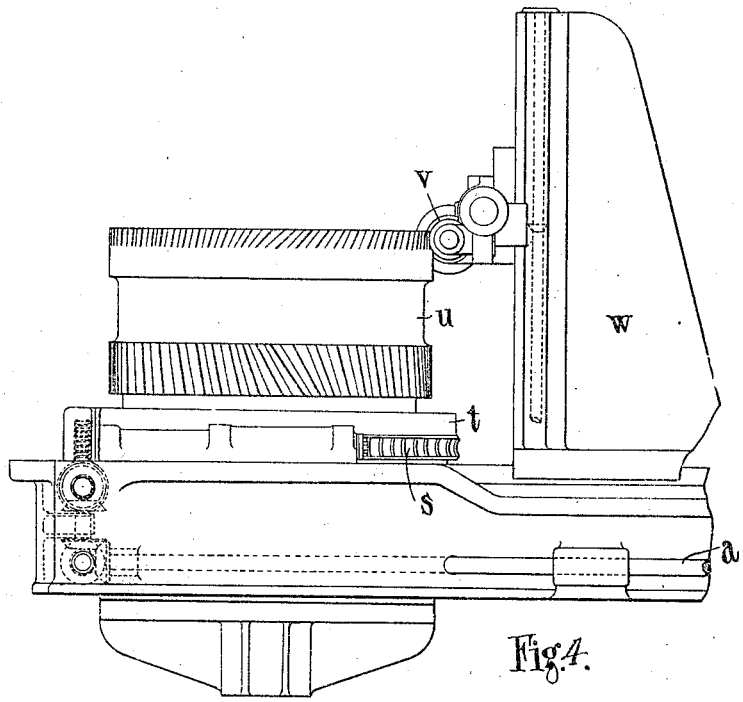
Figure 9:
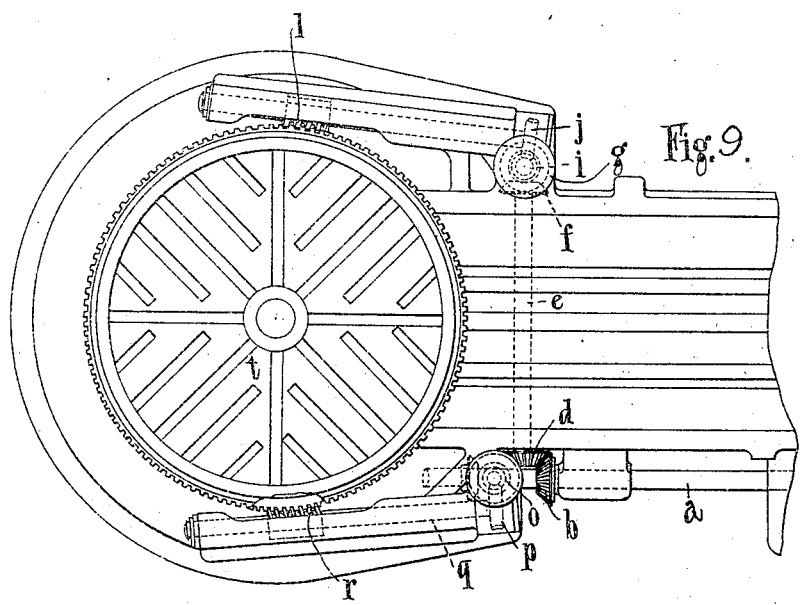
Figure 6:
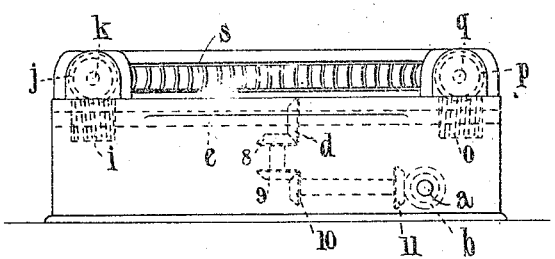
Figure 5:
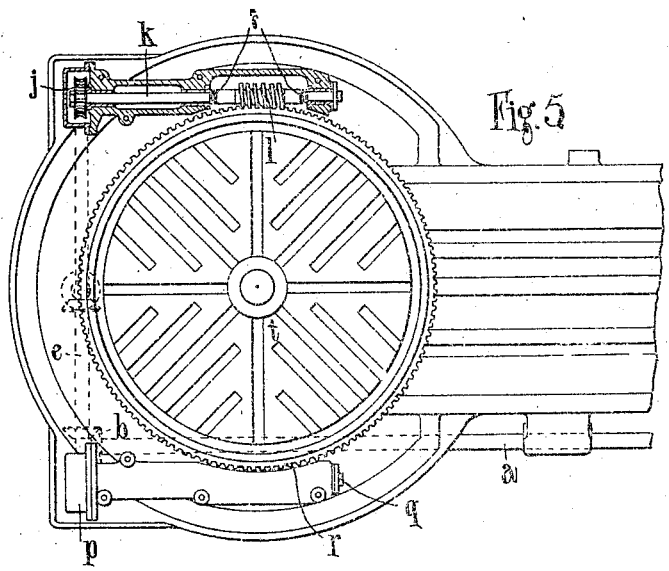
Figure 8:
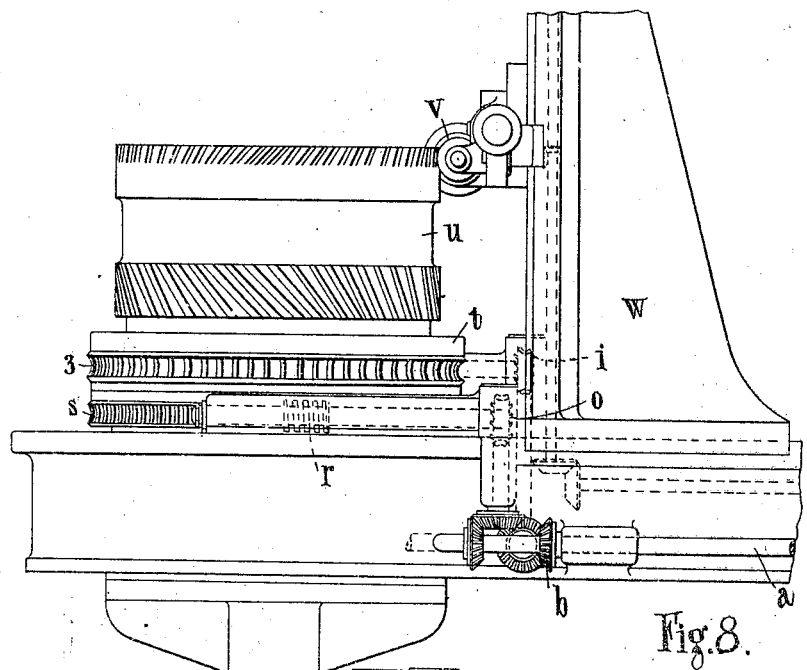
Figure 10:
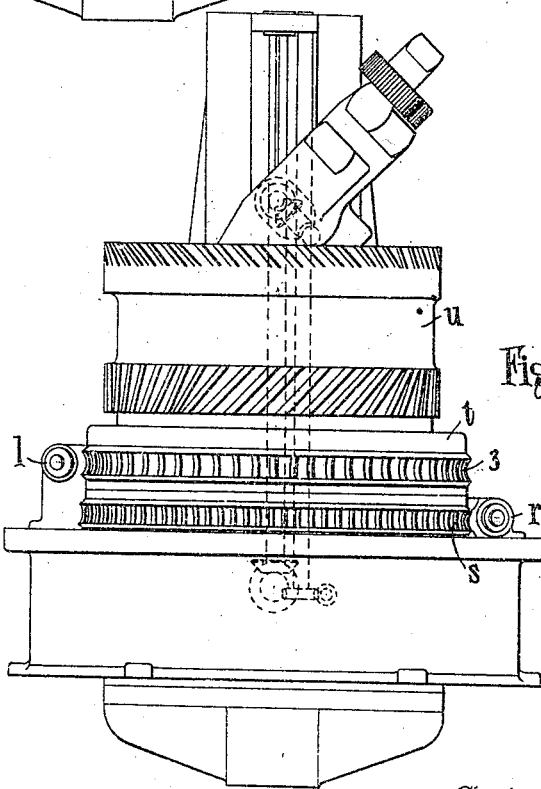
Figure 12:
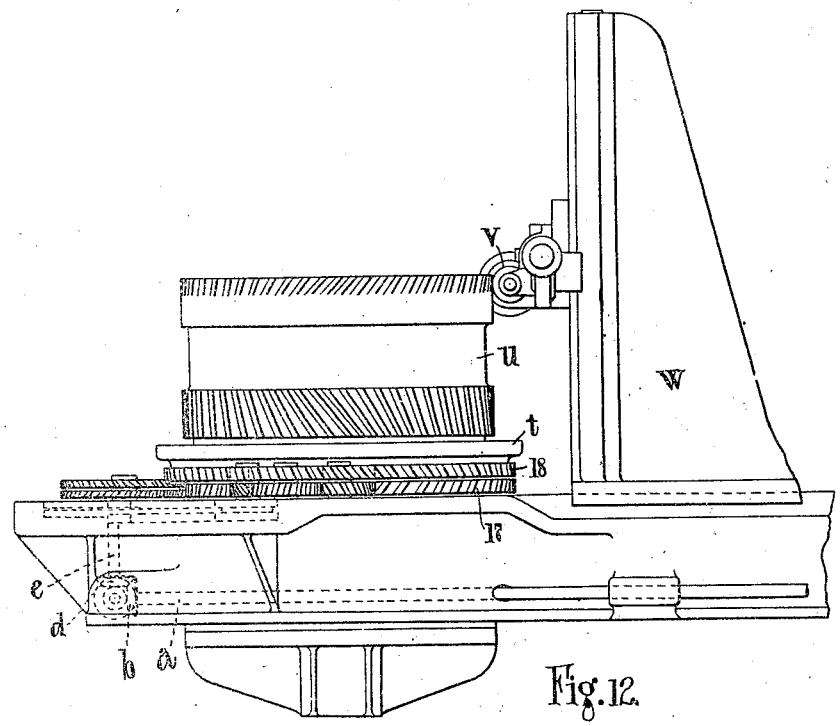
Figure 13:
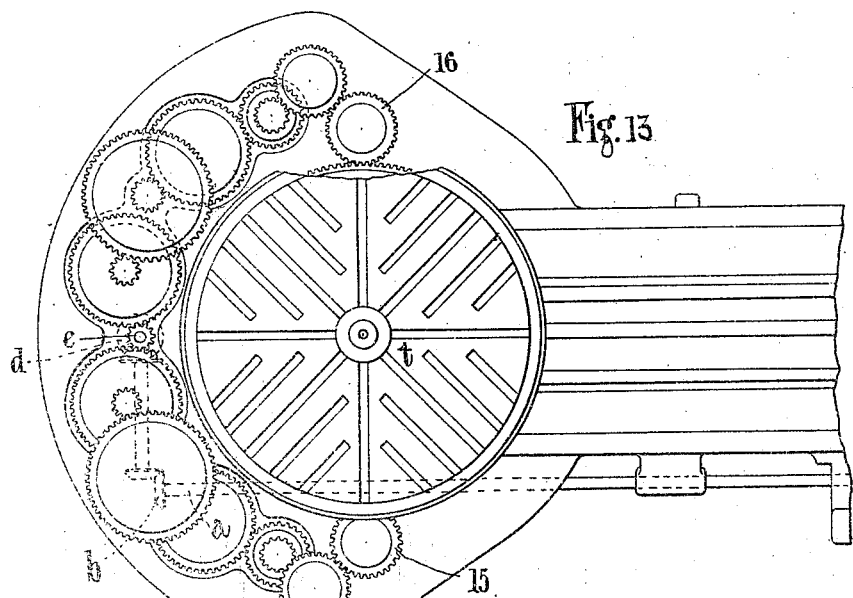

Referring now to the accompanying drawings:—Figures 1 and 2 represent in elevation and plan respectively a portion of a gear cutting machine adapted to the present invention, the sectional part of Fig. 1 being taken on the line A—A of Fig. 2. Fig 3 is a view similar to Fig. 1, illustrating a further form of gear cutting machine according to the present invention. Fig. 4 is a side elevation of a gear cutting machine embodying two forms of the present invention. Fig. 5 is a plan of Fig. 4. Fig. 6 is a front view of Fig. 4. Fig. 7 shows details of one of the worms with balancing springs. Fig. 8 is a side elevation of a modified form in which two worm wheels are employed. Fig. 9 is a plan of Fig. 8. Fig. 10 is a front elevation of Fig. 8. Fig. 11 is a detail view showing the adjustment provided for worms on their spindles in the cases in which fixed worms are employed. Fig. 12 is a side elevation of the form of the invention in which spur wheels are employed to drive the work table instead of worms and worm wheels. Fig 13 is a plan of Fig. 12.

In carrying this invention into effect in a gear cutting machine as shown in Figs. 1 and 2, the shaft *a*, (which will hereinafter be referred to as the driving shaft) carries two bevel wheels, *b*, *c*. A bevel wheel, *d*, engages with the bevel wheel, *b*, and is mounted on a shaft, *e*, extending across the bed of the machine. This shaft at its farther end is provided with a second bevel wheel, *f*, engaging with a bevel wheel, *g*, on a vertical spindle, *h*, which terminates in a worm, *i*. Engaging with this latter is a worm wheel, *j*, on a spindle, *k*, which at one part of its length is formed with a worm, $l$. A similar arrangement is provided in connection with the second bevel wheel, $c$, on the driving shaft, $a$. The bevel wheel, $c$, engages with a bevel wheel, $m$, on the vertical shaft, $n$, which terminates in a worm, $o$. The latter engages with a worm wheel, $p$, on a spindle, $q$, which, similar to the spindle, $k$, is provided for a portion of its length with a worm, $r$. Both the worms, $l$ and $r$, engage with a worm wheel, $s$, attached to the table, $t$, on which the work, $u$, is mounted. The cutter, $v$, is mounted on a standard, $w$, and is driven and moved by any suitable means. In this arrangement the worms, $l$ and $r$ must necessarily be of same pitch and be rotated at the same speed.

It will be seen that the rate of movement of the table, $t$, is controlled by the two worms, $l$ and $r$, and any irregularity in the movement of this table arising from an irregularity in either of the worms or from an irregularity in the teeth of the worm wheel, $s$, passing in contact with one of said worms, is checked by the engagement of the other worm with the worm wheel. It is desirable that the portion of the circumferential length along the pitch circle between the points of contact of the worms, $l$ and $r$, with the worm wheel, $s$, should not comprise exactly a whole number of teeth pitches but should include a fraction of a tooth pitch so that these points of contact do not simultaneously correspond to similar parts of the teeth. Also it is in general preferred to place the worms so that the circumferential distance between them is half a pitch distance greater or less than the half circumference of the worm wheel, so that their engagements are in opposite phase, both as regards the period of rotation of the work and as regards individual teeth of the driven wheel. In some cases it may be necessary to provide springs or some form of differential gear to obtain an approximately equal division of the driving force between the worms, $l$, $r$, but generally the natural elasticity of the shafts and supporting structure will be sufficient for this purpose. As an example of such spring means see Figs. 4 to 6, where helical springs 7 are placed on either side of the worms $l$ and $r$, which are splined to the shafts $k$ and $q$, and are allowed a small end play upon the shafts $k$ and $q$, so that they may adjust themselves until a balance of driving force between them is obtained.

Figs. 4 to 6 also show the application of differential gear to balance the drive. In this case the cross shaft $e$ is placed at the front of the machine, and has the worms $i$ and $o$ of opposite hand mounted directly upon it. The shaft $e$ is allowed a small end play, so that the opposite end thrusts of the worms $i$ and $o$ may adjust themselves. Owing to the position of the shaft $e$ in this form it is necessary to introduce a train of gear wheels, 8, 9, 10 and 11 between the bevels $b$ and $d$. Both the forms of balancing shown may be used together or separately, and may be employed in connection with any of the modifications herein described. Fig. 7 shows details of one of the worms with springs 7, the worm being provided with a feather 13.

In the arrangement according to Fig. 3, the vertical shafts, $h$ and $n$, are each provided with two worms, not shown on the former, and indicated by the letters $o$, $y$, on the latter. The worm, $o$, engages with a worm wheel, $p$, on a spindle, $q$, provided with a worm, $r$, as before. The worm, $y$ engages with a worm wheel, $z$, mounted on a spindle, $l$, and also provided with a worm, 2. The worm, $r$, engages with a worm wheel, $s$, and the worm 2 with a worm wheel, 3, both of which are attached to the table, $t$, on which the work, $u$, is mounted. The worms on the vertical shaft, $h$, are similarly arranged to transmit their rotation to the table, $t$, through two worms engaging with the worm wheels, $s$ and 3, respectively. In this modification it will be seen that the rate of movement of the table, $t$, is controlled by four worms. In order to break the correspondence of the periodicity of the irregularities in the rate of movement of the table due to irregularities in any of the four worms, or in either of the worm wheels, the latter are preferably made with teeth of different pitch, the worms engaging with one worm wheel being, of course, of corresponding pitch. The worms engaging with one worm wheel will then have to be rotated at a different speed to those in engagement with the other worm wheel, and this difference of speed is suitably provided for in the means connecting the driving shaft, $a$, with the spindles on which the worms are mounted. If, however, the worm wheels, $s$ and 3 are made of the same pitch the teeth in these wheels are inter-pitched circumferentially, this latter being the arrangement illustrated in Fig. 3. Only a single worm driving each of the worm wheels, $s$ and 3 may be provided if desired, see Figs. 11 to 13 these single worms rotating at the same or different speeds according as to whether the worm wheels $s$ and $r$ are provided with teeth of similar or different pitch. In the form shown in Figs. 8 to 10, the teeth of the wheel $s$ are of finer pitch than the teeth of the wheel 3.

Adjusting means of any usual type may be provided with any of the foregoing modifications in which the worms are normally fixed to their shafts for the purpose of moving the worms along their axes until each is actually in working contact with the teeth of its respective worm wheel, for example, nuts 12 fitting upon screwed portions of the shafts, and holding the worms between distance pieces 14 upon keys 15 may be employed, as shown in Fig. 11. Other forms of driving gear may be employed, the members thereof being arranged in multiple in a similar way. For instance, see Figs. 12 and 13, the worms and worm wheels above referred to may be replaced by pinions 15 and 16 and spur wheels 17 and 18 respectively. The wheels 17 and 18 preferably have single helical teeth, and trains of helical spur wheels and pinions are carried around to the front of the machine, where they engage with a pair of pinions mounted upon a common vertical shaft $e$, these latter pinions being of opposite hand, and the shafts $e$ being allowed a certain small longitudinal freedom, a differential action takes place, so that these pinions transmit equal forces to the two trains, and consequently to the two wheels 17 and 18. The shaft $e$ in this form corresponds to the shaft $e$ in Fig. 6. In this manner the angular movement of the work is made to register with the average configuration of the parent gear, and consequently the errors which would be introduced by any of the separate drives are eliminated or at least greatly reduced.

It will be seen that the relative position of the member forming the teeth and the wheel on which the teeth are being formed is determined by the general or average configuration of the members of the parent gear. Any small residual errors as may be left in the teeth of the gear wheel formed in a machine having a multiple drive as above described may be eliminated by grinding the gear teeth with laps of suitable shape, such as are described in my copending application for Letters Patent filed March 25th, 1913, Ser. No. 756,762.

Having now described our invention what we claim as new and desire to secure by Letters Patent is:—

1. A gear cutting machine comprising in combination a work table, driven means attached to said table, multiple driving means engaging with said driven means, and means to equalize the driving moments of the different driving means.

2. A gear cutting machine comprising a table on which the work is mounted, a driven member attached to said table, a pair of driving members engaging with said driven member and in opposite phase relation as regards the angular position of their points of engagement with the driven member and also as regards their points of engagement with the individual teeth of said driven member.

3. A gear cutting machine comprising a table on which the work is mounted, a driven member attached to said table, a pair of driving members engaging with said driven member, and in opposite phase relation as regards the angular position of their points of engagement with the driven member and also as regards their points of engagement with the individual teeth of said driven member, and differential or balance gear to equalize substantially the driving forces of the driving members.

4. A gear cutting machine comprising a table on which the work is mounted, a driven member attached to said table, multiple driving members in engagement with said driven member and spring means to equalize approximately the driving forces of the different driving members.

5. A gear cutting machine comprising in combination a work table, driven means attached to said table, multiple driving means in engagement with said driven means and differential means to equalize the driving forces of the different driving means.

6. A gear cutting machine comprising in combination a work table, worm wheel means attached to said table, a plurality of worms engaging with said worm wheel means and means between said worms to equalize the driving forces between them.

7. In combination in a gear cutting machine, a work table, driven means attached to said table, multiple driving means engaging said driven means, and means between said driving means acting to convey driving force to and equalize the driving forces upon the several driving means.

8. A gear cutting machine comprising in combination a work table, spiral gear means attached to said table, multiple spiral driving means engaging said spiral gear means, and means to equalize the driving forces upon the several spiral driving means.

9. A gear cutting machine comprising in combination a work table, indexing means attached to said table, and multiple driving means engaging with said indexing means, the points of engagement of said driving means with said indexing means being located on radii from the axis of said work table, said radii being mutually inclined.

10. A gear cutting machine comprising in combination a work table, indexing means attached to said table, multiple driving means engaging with said indexing means, the points of engagement of said driving means with said indexing means being located on mutually inclined radii from the axis of said work table, and means between said driving means to equalize the driving forces upon them.

11. A gear cutting machine comprising in combination a work table, a worm wheel attached to said table, and multiple worms engaging with said worm wheel, the axes of said worms being mutually inclined.

12. A gear cutting machine comprising in combination a work table, a worm wheel attached to said table, multiple worms engaging with said worm wheel, the axes of said worms being mutually inclined, and means between said worms to equalize the driving forces upon them.

In testimony whereof, we affix our signatures in presence of two witnesses.

CHARLES ALGERNON PARSONS.
STANLEY SMITH COOK.

Witnesses:
CHARLES P. MARTIN,
BERTRAM H. MATTHEWS